(12) United States Patent
Alvarez (10) Patent No.: US 11,363,171 B2
(45) Date of Patent: Jun. 14, 2022

(54) OUTPUT ADJUSTMENTS IN COLOR TABLES WITH NODES ARRANGED IN A VECTOR OF FIRST COLOR PERCEPTION PARAMETER ACCORDING TO AN ORDER OF AN INCREASING SECOND COLOR PERCEPTION PARAMETER

(71) Applicant: Hewlett-Packard Development Company, L.P., Spring, TX (US)

(72) Inventor: Miguel Angel Lopez Alvarez, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/296,231

(22) PCT Filed: May 15, 2019

(86) PCT No.: PCT/US2019/032462
§ 371 (c)(1),
(2) Date: May 22, 2021

(87) PCT Pub. No.: WO2020/231425
PCT Pub. Date: Nov. 19, 2020

(65) Prior Publication Data
US 2022/0060606 A1 Feb. 24, 2022

(51) Int. Cl.
*H04N 1/60* (2006.01)
(52) U.S. Cl.
CPC ......... *H04N 1/6038* (2013.01); *H04N 1/6008* (2013.01); *H04N 1/6025* (2013.01)

(58) Field of Classification Search
CPC ... H04N 1/6038; H04N 1/6008; H04N 1/6025
See application file for complete search history.

(56) References Cited

U.S. PATENT DOCUMENTS

| | | |
|---|---|---|
| 5,081,529 A | 1/1992 | Collette |
| 5,521,723 A | 5/1996 | Madden et al. |
| 5,978,011 A * | 11/1999 | Jacob .................. C09D 11/02 347/240 |
| 6,178,008 B1 | 1/2001 | Bockman et al. |
| 6,876,467 B1 * | 4/2005 | Yamaguchi .......... B41J 11/0095 347/172 |
| 7,068,394 B2 | 6/2006 | Silverbrook et al. |
| 2002/0163657 A1 | 11/2002 | Bogdanowicz et al. |

(Continued)

*Primary Examiner* — Christopher Wait
(74) *Attorney, Agent, or Firm* — Dicke, Billig & Czaja, PLLC (57) ABSTRACT

A color table is modulated. The color table includes a plurality of nodes, and each node corresponds with a color input in the first color space and provides a print output in a second color space. The set of the plurality of nodes are arranged in a vector of a first color perception parameter. The vector can be arranged according to an order of increasing second color perception parameter in the first color space to an end node of the set of the plurality of nodes. A node in the set of the plurality of nodes that provides a peak amount of the second color perception parameter on the medium is determined. The print output for the end node is replaced with a print output corresponding with the node that provides the peak amount of the second color perception parameter on the medium.

15 Claims, 3 Drawing Sheets

(56) References Cited

U.S. PATENT DOCUMENTS

| | | |
|---|---|---|
| 2003/0202043 A1 | 10/2003 | Zeng et al. |
| 2011/0075172 A1 | 3/2011 | Katayama |
| 2013/0093783 A1 | 4/2013 | Sullivan et al. |
| 2013/0222859 A1 | 8/2013 | Uratani et al. |
| 2017/0186403 A1 | 6/2017 | Chang et al. |
| 2020/0112652 A1* | 4/2020 | Kroon .................. H04N 1/6022 |

* cited by examiner

OUTPUT ADJUSTMENTS IN COLOR TABLES WITH NODES ARRANGED IN A VECTOR OF FIRST COLOR PERCEPTION PARAMETER ACCORDING TO AN ORDER OF AN INCREASING SECOND COLOR PERCEPTION PARAMETER

BACKGROUND

Color management systems deliver a controlled conversion between color representations of various devices, such as image scanners, digital cameras, computer monitors, printers, and corresponding media. Device profiles provide color management systems with information to convert color data between color spaces such as between native device color spaces and device-independent color spaces, between device-independent color spaces and native device color spaces, and between source device color spaces and directly to target device color spaces.

DETAILED DESCRIPTION

A color space is a system having axes and that describes color numerically. Some output devices, such as printing devices, may employ a type of subtractive color space, which can include a type of cyan-magenta-yellow (CMY) color space or cyan-magenta-yellow-key (black) (CMYK) color space, while some software applications and display devices may employ a type of additive color space, which can include a type of red-green-blue (RGB) color space. For example, a color represented in an RGB color space has a red channel value, a green channel value, and a blue channel value, and a color represented in a CMY color space has a cyan channel value, a magenta channel value, and a yellow channel value, that combined numerically represent the color. A color gamut for a device is a property of the device that includes the range of color (and density/tonal values) that the device can produce as represented by a color space. Many colors in the gamut of a CMYK color space for printing devices can be rendered from just the set of colors including cyan, magenta, and yellow and, in some color resource models, do not include a black channel component. In some printing devices and printing modes, however, an achromatic black channel component can be added to some of colors in in the CMYK color space order to reduce process color print substance consumption for some darker colors, stabilize neutral color such as in the grey tones, and to improve printability of blacks.

A color management resource is a set of data based on the color gamut characterization in a color space. A color profile is an example of a color management resource. A color profile is a formal set of data that characterizes the color gamut in a color space. In one example, a color profile can describe the color attributes of a particular device or viewing specifications with a mapping between the device-dependent color space, such as a source or target color space, and a device-independent color space, such as profile connection space (PCS), and vice versa. The mappings may be specified using tables such as look up tables, to which interpolation can be applied, or through a series of parameters for transformations. Devices and software programs—including printing devices, monitors, televisions, and operating systems—that capture or display color can include color profiles that comprise various combinations of hardware and programming. An ICC profile is an example color profile that is a set of data that characterizes a color space according to standards promulgated by the International Color Consortium (ICC). Examples of this disclosure using particular profiles, such as ICC profiles, however, are for illustration only, and the description is applicable to other types of color profiles, color management resources, or color spaces.

The ICC profile framework has been used as a standard to communicate and interchange between various color spaces. An ICC output profile includes color table pairs, so-called A2B and B2A color look up tables, where A and B denote the device-dependent and the device-independent color spaces, respectively. For different devices, there are different look up table rendering intent pairs. For example, an ICC profile allows for three color table pairs, enumerated from 0 to 2, enabling the user to choose from one of the three possible rendering intents: perceptual, colorimetric, or saturation. ICC profiles are often embedded in color documents as various combinations of hardware and programming to achieve color fidelity between different devices. The size of color tables will increase with finer sampling of the spaces and larger bit depths.

Color tables that provide transformations between various color spaces are extensively used in color management, common examples being the transformations from device independent color spaces (such as CIELAB, i.e., $L^*a^*b^*$) to device dependent color spaces (such as RGB or CMY) and vice versa. The mappings may be specified using tables such as single dimensional or multidimensional look-up tables, to which interpolation can be applied, or through a series of parameters for transformations. A color table can include an array or other data structure stored on a memory device that replaces runtime computations with a simpler array indexing operation as a color look-up table. Color tables can also include monochromatic and greyscale color tables.

Printing devices, including printing devices that print in full color mode and printing devices that print in black and white or monochromatic mode, employ color management systems including color management resources to deliver a controlled conversion between color representations of various devices, such as image scanners, digital cameras, computer monitors, printers, and software applications including operating systems, browsers, and photo and design programs often to a subtractive color space or a monochromatic color space such as greyscale. Printing devices can include printers, copiers, fax machines, multifunction devices including additional scanning, copying, and finishing functions, all-in-one devices, or other devices such as pad printers to print images on three dimensional objects and three-dimensional printers such as additive manufacturing devices. In general, printing device often employ a device component to impart a color onto a medium.

In one example, printing devices can impart a color onto a medium via applying a print substance, which can include printing agents or colorants often in a subtractive color space or black, to the medium via a device component generally referred to as a printhead. A medium can include various types of print media, such as plain paper, photo paper, polymeric substrates and can include any suitable object or materials to which a print substance from a printing device are applied including materials, such as powdered build materials, for forming three-dimensional articles. Print substances, such as printing agents, marking agents, and colorants, can include toner, liquid inks, or other suitable marking material that may or may not be mixed with fusing agents, detailing agents, or other materials and can be applied to the medium. Instances of the example printing device can include an inkjet printer or a laser printer that apply the print substance to the medium. Examples of printheads on inkjet printers can include piezo printheads or thermal printheads (the latter of which are distinguishable from thermal energy printheads).

Some example printing device, however, do not apply a print substance to a medium. Instead, the printing devices impart a color onto a medium via applying energy to a medium to activate print substances in the medium. In one such example, printing devices can apply an energy profile via a device component to an energy-activated medium having a plurality of image-forming layers, often in a subtractive color space, that are selectively activated by the energy profile. The image-forming layers of the medium undergo a change in color in response to the energy profile, and the change in color may be from colorless to color, from colored to colorless, or from one color to another color. In one example, the energy-activated medium can include a plurality of image-forming layers carried by a substrate. For instance, the substrate may include a white, reflective material having a first surface onto which a cyan image-forming layer is applied. A magenta image-forming layer can be applied over the cyan image-forming layer, and a yellow image-forming layer can be applied over the magenta image-forming layer. An overcoat may be applied to the yellow image-forming layer. In one example, the image-forming layers contain colorless crystals of amorphochromic dyes. The dyes form microcrystals of their colorless tautomers, which convert to the colored form by melting and retain color after re-solidification. The image forming layers may be separated by thin interlayers that act has insulation to moderate energy throughput in the medium.

The energy imaging printing device achieves color addressing via a selected energy profile, including a predetermined time and intensity, that is applied to the medium. In one example, the energy is a thermal energy and a thermal energy printhead applies a selected thermal profile having a heat pulse length and intensity. (The thermal energy printhead in this example is distinguishable from a thermal inkjet printhead of a printing device that applies the print substance to the medium.) In one example, the yellow image-forming layer is sensitive to short heat pulses of high temperature, the magenta image-forming layer is sensitive to longer heat pulses of moderate temperature, and the cyan image-forming layer is sensitive to long pulses of lower temperature. The image-forming layers are separated by thermal insulating interlayers. In many thermal imaging printing devices, however, thermal energy transfer between the image-forming layers is difficult to control, which can result in an undesired activation of an image-forming layer that can degrade image quality. The effect of an undesired activation of an image-forming layer in an energy-activated medium is often referred to as "crosstalk."

Printing devices often employ color curves or color tables to provide transformations between input color spaces and subtractive color spaces to determine corresponding formulations of print substance amounts or energy profiles to render the intended colors. In one example, printing devices often employ color tables including color look-up tables to provide transformations between different color spaces such as from input device-independent colors to CMYK print substance amounts in the case of two-dimensional printing devices for applying print substances to substrates or, in the case of three-dimensional printing devices, printing agent amounts for printing on a powder or other material. Printing devices that impart a color onto the medium via energy imaging printheads to energy-activated media, form the gamut of colors from the layers of the medium. In the example of three image-forming layers, the gamut of colors are formed in the CMY space, and can employ three one-dimensional primary activation curves, or a one-dimensional activation curve for each primary colorant, to provide transformations between an input color space and an output color space to generate an energy profile.

For printing devices, color management resources including the color tables can be embedded in memory devices storing the printer firmware or other hardware such as a controller. In some examples, the particular color transform of the color management resource may be colorant-dependent, such as dependent on the particular formulation of each of the print substance included in a supply component such as a print substance cartridge or the energy-activated medium, and information regarding the color gamut characterization in the color management resource can be stored on a memory device located on a cartridge or downloaded into memory for use with the printing device such as its firmware or other hardware.

In one example, a color management resource for a printing device may include a plurality of multidimensional color tables that can correspond to media, rendering intents, and colorant axes of a color gamut, ambient temperature ranges, among other things, included in a color profile. In general, a profile can include N color tables to be processed, such as $CLUT_1, CLUT_2, \ldots, CLUT_N$, and the input color space includes $J_{in}$ channels. In one example, multiple color tables representing different rendering intents can be included with one ICC profile. Additionally, the output color space includes $J_{out}$ channels, and in many examples of an ICC profile $J_{in}$ and $J_{out}$ can be three or four channels. For each output channel, the corresponding lookup table contains $M^{J_{in}}$ nodes. For example, each color table can include $M^4$ nodes for each of the cyan, magenta, yellow, and black colorants corresponding with each print substance color used in the printing device or $M^3$ nodes for each of the red, green, and blue three additive primaries corresponding with each primary color used in the display device.

As an example used for illustration in this disclosure, a color table to convert an input value in an RGB color space to a corresponding print output value in the CMY color space that can be transformed to an energy profile, such as thermal pulse length and intensity for delivery to a thermal energy printhead, to produce the color on an energy-activated medium in a CMY space may include $17^3$ nodes, or 4913 nodes. In one example, each color in the example RGB color space may be represented as an eight bits per channel input. In one sample provided for a color table, each channel can have an eight bit input value selected from the set of seventeen input values including 0x00, 0x10, 0x20 . . . 0xE0, 0xF0, and 0xFF. For instance, the input 0x0000FF may represent blue in the example RGB color space, the input 0x00FFFF may represent cyan or aqua blue in the example RGB color space, and the input 0x000080 may represent navy blue in the example RGB color space. The color table maps the inputs in the RGB color space to eight, ten, or twelve bit values per channel in the CMY color space, which then can be transformed to an energy profile to be applied via an energy-imaging printhead, to generate the corresponding color in CMY of an energy-activated medium. In an example of an eight bit per channel CMY color space output, a color table may receive a twenty-four bit input from the RGB color space and produce an twenty-four bit output representing a print output in the CMY color space as follows:

| Node No. | RGB Input |    | CMY Output |
|----------|-----------|----|------------|
| 1        | 0x000000  | -> | 0xFFFFFF   |
| 2        | 0x000010  | -> | 0xFFFFEF   |
| 3        | 0x000020  | -> | 0xFFFFDF   |
| .        | .         |    | .          |
| 17       | 0x0000FF  |    | 0xFFFF00   |
| .        | .         |    | .          |
| 4912     | 0xFFFFF0  | -> | 0x00001D   |
| 4913     | 0xFFFFFF  | -> | 0x000000   |

Thus, the example color in the RGB color space having an input value of 0x0000FF into the color table, which may represent the color blue, corresponds with a red channel value of 0x00, a green channel value of 0x00, and a blue channel value of 0xFF, would be converted to a print output value in the CMY color space having a cyan channel value of 0xFF, a magenta channel value of 0xFF, and a yellow channel value of 0x00. These values may then be converted to an energy profile via a table or calculations to provide corresponding signals to a thermal energy printhead. In the example color table, the nodes are indexed from 1 to $M^{J_{in}}$ by order of increasing input value, but the nodes of the color table may be indexed via other criteria.

Often, a color gamut for the input color space will include more than $M^{J_{in}}$ colors. In the present example, the color gamut for a printing device often includes more than 4913 colors, and print substance formulations for certain input colors are not be found in the color table. For example, the input value 0x4169E1 may represent the color royal blue in the example RGB color space, but would not correspond with a node in the color table and thus would not map to a print output in the table. The example royal blue would appear between table nodes having input values 0x4060E0 and 0x5070F0 and may be considered an intermediate color on an intermediate node. Print outputs for such intermediate colors can be determined via interpolation using table nodes in the color table with firmware for the printing device.

Color calibration of printing devices attempts to provide a consistent color output for a given color input over time, from printing device to printing device, and from medium to medium. In the case of energy imaging printing devices, color calibration is also performed to attempt to provide consistent color output at different temperatures. Parameters that can cause an energy imaging printing device to output colors differently can include ambient humidity, temperature variations in the printheads, variance due to tolerances in printheads or electrical components, and different properties in the components of the medium. Calibration is performed for energy imaging printing devices as well as for the energy-activated media to be fed to the energy imaging printing devices.

A typical calibration of an energy imaging printing device is performed once during manufacture on a single batch of media. The calibration can include an iterative process of printing an input target having a plurality of color patches, measuring the printed patches of the printed target with a colorimeter or spectrophotometer, and adjusting parameters to modify a color pipeline for the next printing.

A typical target includes a plurality of neutral, or grey, colors. Given the particularities of thermal printing technologies, many believed that careful calibration and adjustment of grey colors could provide calibration and adjustment to the remaining colors of the color space. Accordingly, many thermal printing devices are architected to include three one-dimensional primary activation curves, which allow for the easy and accurate adjustment of neutrality in grey colors. Given the three-dimensional color space nature of the colorants in the medium, however, the three one-dimensional primary activation curves were insufficient to appropriately control color calibration. For example, the thermal printing devices created crosstalk in saturated reds, which were generated with the yellow and magenta layers of the medium, that unintentionally activated the cyan layer, and saturated reds became almost black. Excess thermal energy was applied to the printheads during the printing of reds, which unintentionally activated the cyan layer of the medium, due to an inaccurate color calibration in the range of red colors. In an attempt to address this issue, the typical targets were modified to include patches of saturated colors of red, blue, magenta, and yellow that were measured and included in the calibration and adjustment of the one-dimensional primary activation curves. These saturated colors on the target could detect unintentional activation of adjacent image-forming layers of the medium. In an attempt to control crosstalk in the saturated colors, a tradeoff was made between an amount of control of crosstalk in the saturated colors and the accuracy of greys. Despite attempts to balance the accuracy of greys and crosstalk in saturated colors, the issue of unintentional crosstalk in images produced with thermally activated media by thermal printing devices creates dissatisfaction in users.

This disclosure introduces the use of a three-dimensional color table, rather than one-dimensional primary activation curves, as color resources in energy imaging printing devices, such as thermal imaging printing devices that apply a thermal profile to a thermally-activated medium having image-forming layers in the subtractive color space. The disclosure includes example methods to generate or modulate a three-dimensional color table for the energy imaging printing device. In one example of the method, color patches for a plurality of color ramps are printed and measured with a colorimeter or spectrophotometer. The color ramps in one example can be arranged to correspond with a color vector according to a first color perception parameter, such as hue. For instance, the energy imaging printing device may print a color ramp for each of the primary colors of cyan, magenta, and yellow and for each of the secondary colors of red, green, and blue in the subtractive color space. The patches of the color ramps, which can correspond with nodes in the color table, can be indexed by order of an increasing second color perception parameter in the color vector, such as chroma, from an initial patch corresponding with an node to an end patch corresponding with an end node in the example.

In each printed color ramp, the amount of chroma in the patches increases as the ramp is traversed from the initial patch, and, as crosstalk is introduced towards the end patch, the amount of chroma in the patches begins to decrease. Crosstalk reduces chroma in the patches, and as the energy imaging printing device attempts to produce more saturated colors by providing more energy to the printhead, the crosstalk serves to unintentionally reduce the chroma in the patches toward the end patch. Data from measurement of the color ramps of increasing saturation indicates that chroma increases as the printhead applies more energy to produce the color ramp up to a peak, but then crosstalk is introduced and chroma decreases as the printhead applies energy past the peak. Each color vector includes a peak node associated with a patch having a maximum chroma in the color ramp. In modulating the color table, the input color of the end node of the color vector is assigned the print output, and thus energy profile, of the peak node, and the remaining nodes can be rescaled with energy profiles less than the energy profile of the peak node. A fully populated three-dimensional color table is created from three-dimensional interpolation of several nodes corresponding with input colors and associated, rescaled energy profiles selected for each of the primary colors and each of the secondary colors.

Figure 1:
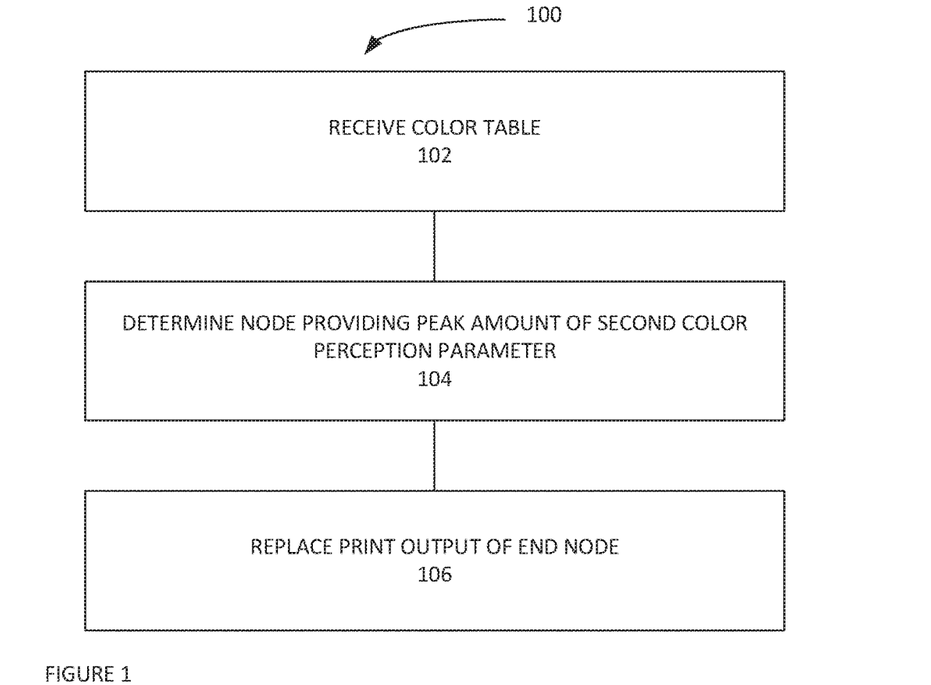
FIG. 1 is a block diagram illustrating an example method.

FIG. 1 illustrates an example method 100 for creating a target color table having a modulated print output, such as print formulation modulated based on reducing crosstalk in a energy-activated medium, from a source color table. In the example, the color tables can be used to map a source color from a first color space to a target color in a second color space on the energy-activated medium and stored on a memory device for use with an energy imaging printing device. In one example, the first color space may be an RGB color space, and, in another example, the first color space may be a CIE L*a*b color space. The first color space may be different than the second color space, and, in one example, the second color space may be a device dependent color space and can include a subtractive color space of an energy-activated medium used in the energy imaging printing device. For instance, the printing device may employ a CMY color space corresponding with image-forming layers of colors of cyan, magenta, and yellow print substances in the energy-activated medium, such as a thermally activated medium. Accordingly, the second color space in one example can be a CMY color space.

In the example method 100, a color table to be modulated is received at 102. The source color table includes a plurality of nodes, and each node corresponds with a color input in the first color space and provides a print output, such as a print formulation, in the second color space. The print formulation can include a three-channel, twenty-four bit value. In one example, each print output can be associated with a corresponding thermal energy profile to be applied to thermally activated medium by a thermal imaging printing device. For instance, the thermal energy profile may be determined via a processing device in the thermal imaging printing device from a print formulation. The set of the plurality of nodes are arranged in a vector of a first color perception parameter. In one example, the first color perception parameter can be hue. For instance, the set of the plurality of nodes can be arranged in a vector of a primary color of the second color space or a secondary color of the second color space. The vector can be indexed according to an order of increasing second color perception parameter in the first color space to an end node. In one example, the second color perception parameter can be chroma. In this example, the a vector a set of nodes of a selected hue, such as magenta, are indexed from an initial node of the set of nodes to an end node of the set of nodes according to increasing chroma.

A determination is made as to which node in the set of the plurality of nodes arranged in the vector provide a peak amount of the second color perception parameter in the second color space on the medium at 104. In one example, a color ramp having color patches corresponding with nodes in the color vector are printed and measured. The node in the set of the plurality of nodes arranged in the vector provide a peak amount of the second color perception parameter in the second color space on the medium can be referred to as the peak node such as the peak node of the vector. The determination of the peak node can be made from measuring color patches printed on the medium for the second color perception parameter, and the node corresponding to the patch having the maximum amount of the second color perception parameter is determined to be the peak node. The amount of the second color perception parameter can be determined for each node of the vector or for a subset of the nodes of the vector to determine the peak node. In one example, the determination of an amount of the second perception parameter is made for each node of the set of the plurality of nodes. In another example, the determination of an amount of the second perception parameter is made of a subset of nodes of the set of the plurality of the nodes in the vector proximate the end node.

The print output for the end node is replaced with a print output corresponding with the node that provides the peak amount of the second color perception parameter on the medium at 106. The color input in the first color space in the end node corresponds with the print output of the peak node. The print outputs for nodes in the vector subsequent the peak node to the end node are removed, and the print outputs for the nodes in the in vector from the initial node to the peak node can be rescaled along the set of nodes of the vector. A target color table can be generated via three-dimensional interpolation based on a print output of the peak node.

Figure 2:
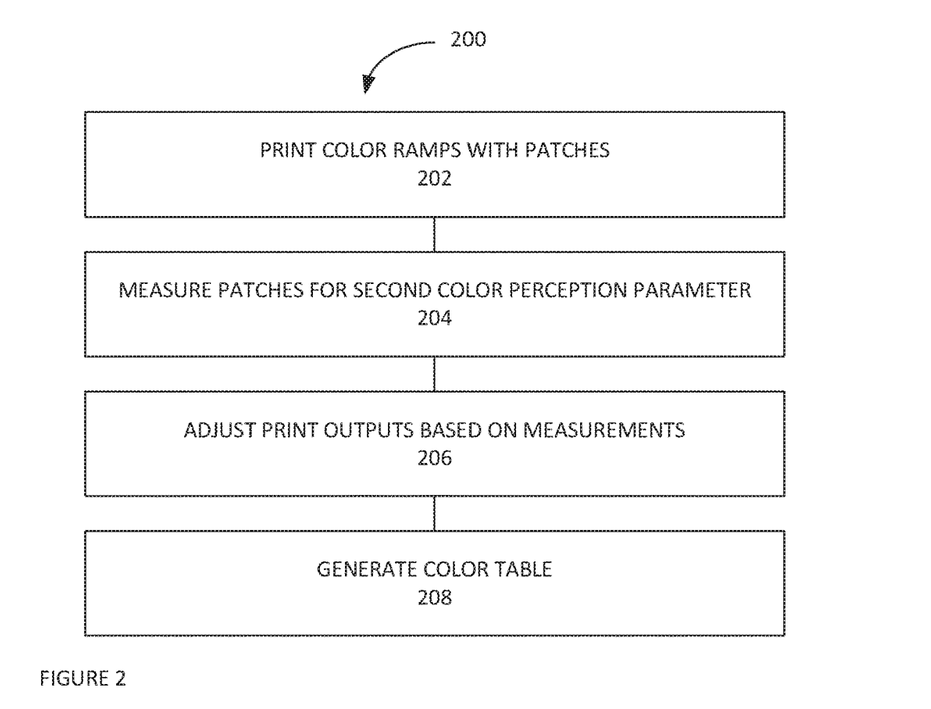
FIG. 2 is a block diagram illustrating an example method to modulate a color table according to the method of FIG. 1.

FIG. 2 illustrates an example method 200 that can implement method 100 to generate a target color table from a source color table for an energy imaging printing device. The source color table is employed to print patches for a plurality of color ramps, each color ramp including a plurality of printed patches, on an energy-activated medium at 202. In the example, the source color table can be used to map a source color from a first color space to a target color in a second color space on the energy-activated medium. An energy-activated medium can include three image-forming layers carried on a substrate to form images in a subtractive color space such as CMY in response to an energy profile applied by the energy imaging printing device. In one particular example, a cyan image-forming layer is applied to a substrate, a magenta image-forming layer is applied on the cyan image-forming layer, and a yellow image-forming layer is applied on the magenta image-forming layer. This example order of the image-forming layer is used for examples in the method 200. Other example combinations of cyan, magenta, and yellow are contemplated, as well as image-forming layers of other colors including black.

Each of the plurality of color ramps can be based on a first color perception parameter, and the plurality of patches of each of the color ramps to be printed can be of varying amounts of a second color perception parameter in the first or second color space. A color perception parameter can include criteria of human color perception such as hue, colorfulness, saturation (also described as intensity or chroma), lightness, and brightness. One particular vector along which a plurality of nodes can be arranged is a hue vector. A single number, or hue angle, can typically represent hue quantitatively, which can correspond with an angular position around a central or neutral point or axis on a color space coordinate diagram such as the h value in the CIE Lab cylindrical representation CIELCh, or L*C*h color space. The L*C*h color space, similar to CIELAB, generally correlates with how the human eye perceives color. The L*C*h color space includes the diagram of the L*a*b* color space but uses cylindrical coordinates instead of rectangular coordinates. In this color space, L* indicates lightness, C* represents chroma, and h is the hue angle. The value of chroma C* is the distance from the lightness axis (L*) and begins at 0 in the center. Hue angle begins at the +a* axis and is expressed in degrees (for instance, 0° is +a*, or red, and 90° is +b, or yellow). A color ramp includes the printed patches on the medium corresponding with nodes of a color vector in the source color table.

In one example, the plurality of color ramps can include printed patches of the primary colors of the image-forming layers, such as patches of varying amounts of chroma of a cyan color ramp, patches of varying amounts of chroma of a magenta color ramp, and patches of varying amounts of chroma of a yellow color ramp. Also, the plurality of color ramps can include patches of the secondary colors of the image-forming layers, such as patches of varying amounts of chroma of a red color ramp, patches of varying amounts of chroma of a green color ramp, and patches of varying amounts of chroma of a blue color ramp. In one example, the color ramps can include an initial patch that include the least amount of chroma in the corresponding color vector, to an end patch that includes the most amount of the chroma in the corresponding color vector. For example, a blue color ramp can include patches printed from nodes along the blue vector in the CMY color space from 0x000000 to 0xFFFF00. In addition to the primary color ramps and the second color ramps, the energy imaging printing device can a print color ramp of neutral colors from nodes of a neutral vector, such as greys from white to black, and a color ramp of high-energy color, such as a blue-to-black color ramp corresponding with a blue-to-black color vector in the color table. The high-energy color ramp may include energy activation of all image-forming layers of the medium for a total of eight color ramps in the example. The printed patches may be ordered on the medium by color ramp, or may be out of order on the medium.

In one example, method 200 can be performed with approximately twenty or fewer patches in each of the eight color ramps. In this example, a target printed on the medium can include approximately 160 patches as compared to 1120 patches printed in a color target for calibrating the three one-dimensional color curves. The fewer color patches of in the target for method 200 provides for a faster modulation process, lower temperature of the thermal imaging printing device (which can introduce less variability into the printed patches), and less media used during manufacturing.

The printed patches can be measured with a colorimeter or spectrophotometer to determine the amount of the second color perception parameter in the patches at 204. In some examples, the printed patches can be measured for other color perception parameters, such as the first color perception parameter. In the example in which the primary color ramps and secondary color ramps each include patches of varying amounts of chroma, patches can be measured for actual amounts of chroma and, for some color ramps, hue angle. The neutral color ramp and blue-to-black color ramp can also be measured for hue angle. In one example, the measurements of the color perception parameters are made in the CIECAM02 color space. The printed patches of each primary color ramp or secondary color ramp, which can correspond with a set of nodes of a respective vector in the nodes of the source table, can be arranged in order of increasing chroma according the corresponding color vector in the nodes of the source color table. As the color ramp is traversed from the initial patch corresponding with an initial node in the vector to the end patch corresponding the end node of the vector, the measured chroma in the printed patches will increase, peak at a maximum chroma, and then begin to decrease. Beyond the peak, crosstalk appears and the patches begin to darken in color, which reduces chroma. The patch with maximum chroma, or in some cases the patch proximate the patch with the maximum chroma, is associated with the peak node.

Based on the measurements of the patches for the first and second color perception parameters, print outputs for a subset of the nodes of the color table are adjusted at 206. For example, the peak nodes for each of the primary color vectors and for each of the secondary color vectors are assigned from determining the color patch having the maximum chroma in each of the primary color ramps and the secondary color ramps. For each of the color vectors for the primary and secondary color vectors, the print output corresponding with the end node of the color vector in the color table is replaced with the print output from the peak node of the respective color vector. Thus, for the blue color vector, the print output of the end node may be 0xFFFF00, which will be replaced by the print output of the determined peak node for the blue color vector. In one example, the peak node in the high-energy color, such as the blue-to-black ramp, can be determined, and the print output for the node in the blue-to-black vector having the maximum chroma can be replaced with the print output of the node corresponding with the patch of the blue-to-black color ramp measured to have the maximum chroma.

Additional nodes can be adjusted based on the measurement at 206. In the example, the patches of the neutral color ramp are measured for CIECAM02 hue angle. A print output for a node corresponding with a patch having a positive hue angle, i.e., a hue angle towards red, may be adjusted to provide additional energy to the cyan layer based on the amount of hue angle. A print output for a node corresponding with a patch having a negative hue angle, i.e., a hue angle towards blue, may be adjusted to provide additional energy to the yellow layer based on the amount of hue angle. The patches of the red, green, and blue color ramps may also be measured for CIECAM02 hue angle. The print output for a node can also be adjusted based on the measured hue angle for the corresponding patch.

A target color table can be generated from adjusted nodes of the source color table at 208. For example, the nodes of the target color table can be fully populated from a group of adjusted nodes of the source color table via three-dimensional interpolation. The adjusted nodes can include adjusted print outputs in response to measurements of the first color perception parameter and the second color perception parameter. In one example, the group of adjusted nodes can include the end nodes having adjusted print outputs for the primary color vectors and the secondary color vectors. In addition, the group of adjusted nodes can include a plurality of nodes along the neutral vector. In one example, the plurality of nodes along the neutral vector can include seven nodes. Still further, the group of adjusted nodes can include a plurality of nodes along each of the secondary color vectors. The outputs of the nodes of along each of the secondary color vectors can include adjusted print outputs, such as adjusted for hue angle or rescaled in response to the adjusted print output end node of the associated vector. In one example, the nodes of the target color table can be fully populated from a group of approximately twenty nodes via three-dimensional interpolation.

Figure 3:
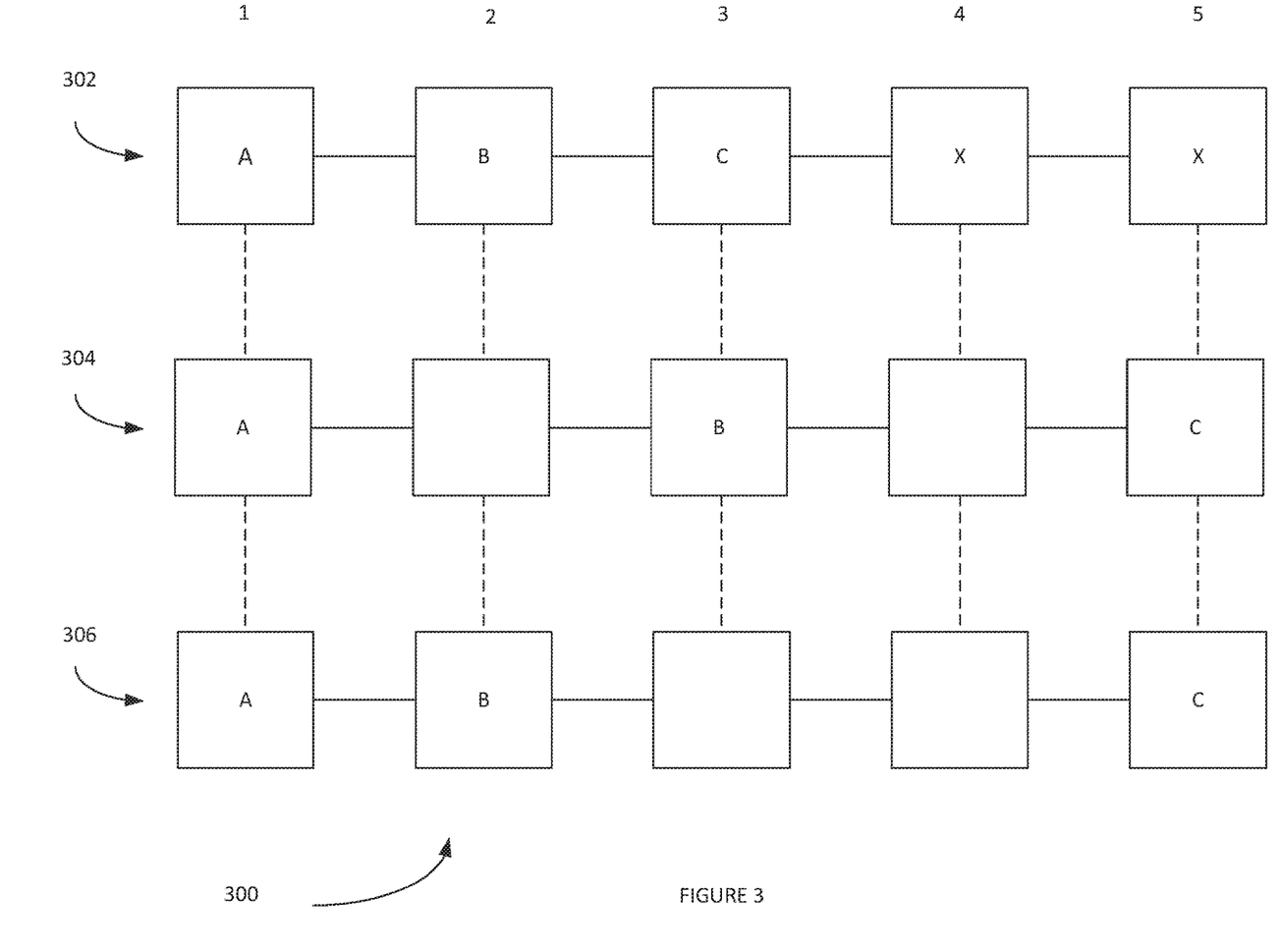
FIG. 3 is a block diagram illustrating example models generated according to the example methods of FIGS. 1 and 2.

FIG. 3 illustrates an example of rescaling and replacing print outputs, such as print formulations, at 206 for a color vector 300 using various models 302, 304, 306. As indicated in the first model 302, vector 300 is indicated having five nodes, such as nodes 1, 2, 3, 4, and 5. Node 1 in the example is the initial node, and node 5 is the end node of the vector 300. Nodes 1-5 each include a print formulation that may be used to generate patches of varying chroma in a color ramp. For example, node 1 includes print formulation A, node 2 includes print formulation B, and node 3 includes print formulation C. Nodes 1-5 in the example are indexed in order of increasing chroma. In the example, node 3 corresponds with a peak node for this illustration such that nodes 4 and 5 provide printed patches that include a chroma less than the amount of chroma in a patch printed from node 3. In the first model 302, print formulations for nodes 4 and 5 have been removed.

The second model 304 illustrates one example of rescaling the remaining print substance formulations of nodes 1-3 for vector 300 from the first model 302. The print formulation which once corresponded with the end node, or node 5, but was removed in the first model 302, is replaced with the print formulation that corresponded with the peak node, or node 3 having print formulation C. In the example rescaling, print formulation B is the replacement print formulation for node 3. In this example, nodes 3 and 5 include replacement print formulations that are reassigned existing print formulations. Print formulation A remains the print formulation for node 1. Nodes without print formulations, such as node 2, which included a reassigned print formulation and node 4, which included a removed print formulation, are provided with new print formulations. In one example, the new print substance formulations can be generated based on the interpolation techniques used to provide print formulations for intermediate colors and the new print substance formulations are stored with the color table. Additional adjustments to the remaining print formulations A, B, C based on measured hue angle or other calibrations.

The third model 306 illustrates another example of rescaling the remaining print substance formulations of nodes 1-3 for vector 300 from the first model 302. The print formulation which once corresponded with the end node, or node 5, but was removed in the first model 302, is replaced with the print formulation that corresponded with the peak node, or node 3 having print formulation C. In the example rescaling, print formulation B remains the print formulation for node 2 and print formulation A remains the print formulation for node 1. Nodes without print formulations, such as node 3, which included a reassigned print substance formulation and node 4, which included a removed print substance formulations, are provided with new print formulations. In one example, the new print formulations can be generated based on the interpolation techniques used to provide print substance formulations for intermediate colors and the new print substance formulations are stored with the color table. Additional adjustments to the remaining print formulations A, B, C based on measured hue angle or other calibrations.

In the illustrated examples of rescaling and replacing print formulations at 206, the print formulations of the nodes of the vector 300 subjected to method 200 include a print formulation that does not provide for crosstalk in the medium. In addition to using interpolation techniques to provide print formulations for nodes having removed or reassigned print formulations at 206, a smoothing function can be applied to the print formulations of nodes of the vector, including nodes between the initial node and the end node, to provide for smooth transition of the color perception parameter, such as chroma, used to index the nodes.

Figure 4:
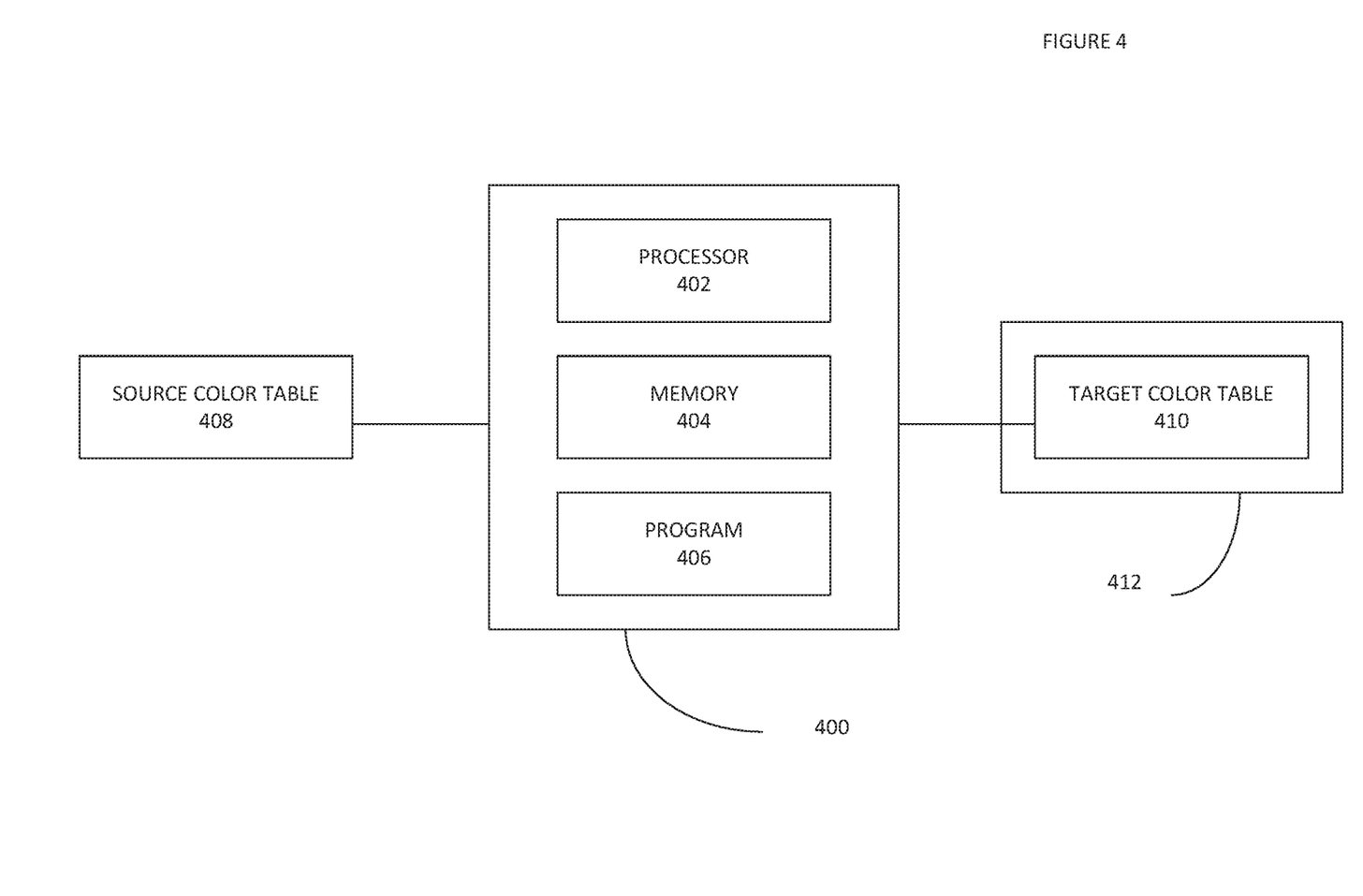
FIG. 4 is a block diagram illustrating an example system to implement the example methods of FIGS. 1 and 2 and produce an example target color table.

FIG. 4 illustrates an example system 400 including a processor 402 and memory 404 and program 406 to implement example methods 100 and 200. System 400 receives the source color table 408 to modulate and generate the target color table 410 on a memory device 412. Source color table 408 includes a plurality of nodes having print formulations stored on a memory device. Memory device 412 can be included with a printing device. In one example, system 400 can be implemented with a computing device. Program 406 can be implemented as a set of processor-executable instructions stored on a non-transitory computer readable medium such as memory 404. Computer readable media, computer storage media, memory, or memory device may be implemented to include a volatile computer storage media, nonvolatile computer storage media, or as any suitable method or technology for storage of information such as computer readable instructions, data structures, program modules or other data. A propagating signal by itself does not qualify as computer readable media, computer readable storage media, memory, or a memory device.

System 400 is configured to receive the source color table 408 having nodes including print formulations on a memory device. The system 400 can receive additional data or resources regarding the nodes, such as data structures including hue angles and chroma information or resources to determine hue angles and chroma amounts and interpolative techniques that may be used to implement methods 100, 200. In one example, the system 400 can receive information regarding color perception parameters from a colorimeter operably coupled to the system 400. In one example, system 400 can generate a bitstream to be stored on memory device 412 as the target color table 410.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
receiving a color table having a plurality of nodes, each node corresponding with a color input in a first color space and providing a print output in a second color space to a medium, a set of the plurality of nodes arranged in a vector of first color perception parameter according to an order of an increasing second color perception parameter in the first color space from an initial node in the vector of the set of the plurality of nodes having a least amount of the second color perception parameter in the first color space of the first color perception parameter in the vector to an end node in the vector of the set of the plurality of nodes having a greatest amount of the second color perception parameter in the first color space of the first color perception parameter in the vector;
determining a node in the vector of the set of the plurality of nodes providing a peak amount of the second color perception parameter in the second color space on the medium; and
replacing a print output in the second color space corresponding with the end node in the vector with a print output in the second color space corresponding with the node in the vector of the set of the plurality of nodes providing the peak amount of the second color perception parameter in the second color space on the medium.

2. The method of claim 1 wherein the first color space is a red-green-blue color space.

3. The method of claim 1 wherein the second color space is cyan-magenta-yellow.

4. The method of claim 1 wherein the first color perception parameter is hue and the second color perception parameter is chroma.

5. The method of claim 1 wherein the color vector corresponds with a primary color in the second color space.

6. The method of claim 1 including a plurality of color vectors corresponding with primary and secondary colors of the second color space.

7. The method of claim 1 wherein the print output corresponds with a thermal energy profile applied via a thermal printhead.

8. The method of claim 1 including adjusting the replaced print output based on a hue angle of the set of nodes of the plurality of nodes in the vector.

9. The method of claim 1 including calibrating the nodes of the color table based on the replaced print output.

10. The method of claim 1 wherein the color vector is arranged from blue to black and the second color perception parameter is chroma.

11. A system, comprising:
a memory to store a set of instructions; and
a processor to execute the set of instructions to:
receive a color table for an energy-imaging printing device, the color table having a plurality of nodes, each node corresponding with a color input in a first color space and providing a print output in a second color space to a medium, a set of the plurality of nodes arranged in a vector of first color perception parameter, the vector according to an order of an increasing second color perception parameter in the first color space from an initial node in the vector of the set of the plurality of nodes having a least amount of the second color perception parameter in the first color space of the first color perception parameter in the vector to an end node in the vector of the set of the plurality of nodes having a greatest amount of the second color perception parameter in the first color space of the first color perception parameter in the vector;
determine a node in the vector of the set of the plurality of nodes providing a peak amount of the second color perception parameter in the second color space on the medium; and
replace a print output in the second color space corresponding with the end node in the vector with a print output in the second color space corresponding with the node in the vector of the set of the plurality of nodes providing the peak amount of the second color perception parameter in the second color space on the medium.

12. The system of claim 11 including instructions to measure chroma of a printed patch corresponding with each node of the set of nodes in the color vector.

13. The system of claim 12 including instructions to measure hue angle of the printed patch corresponding with each node of the set of nodes in the color vector.

14. A non-transitory computer readable medium to store computer executable instructions to control a processor to:
receive a color table having a plurality of nodes, each node corresponding with a color input in a first color space and providing a print output in a second color space to an energy-activated medium, a set of the plurality of nodes arranged in a vector of first color perception parameter, the vector according to an order of an increasing second color perception parameter in the first color space from an initial node in the vector of the set of the plurality of nodes having a least amount of the second color perception parameter in the first color space of the first color perception parameter in the vector to an end node in the vector of the set of the plurality of nodes having a greatest amount of the second color perception parameter in the first color space of the first color perception parameter in the vector;
determine in the vector a node of the set of the plurality of nodes providing a peak amount of the second color perception parameter in the second color space on the energy-activated medium; and
replace a print output in the second color space corresponding with the end node in the vector with a print output in the second color space corresponding with the node in the vector of the set of the plurality of nodes providing the peak amount of the second color perception parameter in the second color space on the energy-activated medium.

15. The non-transitory computer readable medium of claim 14 including instructions to rescale the set of nodes in the vector based on the replaced print output corresponding with the end node.

* * * * *